(12) United States Patent
Kohlstrand et al.

(10) Patent No.: US 8,862,320 B2
(45) Date of Patent: Oct. 14, 2014

(54) METHOD AND APPARATUS FOR AMBIENT LIGHTING INCOMING MESSAGE ALERT

(71) Applicant: Ford Global Technologies, LLC, Dearborn, MI (US)

(72) Inventors: Kelly Michael Kohlstrand, Wyandotte, MI (US); Jeffrey Singer, Canton, MI (US); Roger Hayden, Plymouth, MI (US); Mark Edward Porter, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/827,027

(22) Filed: Mar. 14, 2013

(65) Prior Publication Data

US 2014/0277934 A1    Sep. 18, 2014

(51) Int. Cl.
*G06F 7/00* (2006.01)
*H04W 68/00* (2009.01)

(52) U.S. Cl.
CPC ................... *H04W 68/005* (2013.01)
USPC .......................................................... 701/36

(58) Field of Classification Search
CPC .................................................. H04M 1/6075
USPC .......................................................... 701/36
See application file for complete search history.

(56) References Cited

U.S. PATENT DOCUMENTS

| | | | |
|---|---|---|---|
| 6,539,078 B1 | 3/2003 | Hunt et al. | |
| 6,668,221 B2 | 12/2003 | Harter, Jr. et al. | |
| 6,842,677 B2 | 1/2005 | Pathare | |
| 6,903,652 B2 | 6/2005 | Noguchi et al. | |
| 7,194,069 B1 | 3/2007 | Jones et al. | |
| 7,246,062 B2 | 7/2007 | Knott et al. | |
| 7,337,113 B2 | 2/2008 | Nakagawa et al. | |
| 7,565,230 B2 | 7/2009 | Gardner et al. | |
| 7,764,189 B2 * | 7/2010 | Rubins et al. | 340/691.1 |
| 7,783,475 B2 | 8/2010 | Neuberger et al. | |
| 7,826,945 B2 | 11/2010 | Zhang et al. | |
| 7,830,271 B2 | 11/2010 | Rubins et al. | |
| 7,881,940 B2 | 2/2011 | Dusterhoff | |
| 8,116,437 B2 | 2/2012 | Stillman et al. | |
| 8,285,453 B2 | 10/2012 | Schroeder et al. | |
| 8,502,642 B2 | 8/2013 | Vitito | |

(Continued)

FOREIGN PATENT DOCUMENTS

| | | |
|---|---|---|
| JP | 20070241122 | 9/2007 |
| JP | 20110088502 | 5/2011 |

OTHER PUBLICATIONS

Office Action for corresponding FMC 2657 PCN, application No. 200980155220.9, dated Aug. 30, 2013, 9 pages.

(Continued)

*Primary Examiner* — Maceeh Anwari
(74) *Attorney, Agent, or Firm* — Vichit Chea; Brooks Kushman P.C.

(57) ABSTRACT

A system includes a processor configured to receive settings for one or more vehicle ambient lighting activation sequences. The processor is further configured to receive a signal relating to a notification for which an audio sound could be played. The processor is additionally configured to recognize that an ambient light activation has been enabled. Also, the processor is configured to output a sequence of activated ambient lights within a vehicle, based on the settings and responsive to the received signal.

17 Claims, 4 Drawing Sheets

(56) References Cited

U.S. PATENT DOCUMENTS

| | | |
|---|---|---|
| 2003/0004730 A1 | 1/2003 | Yuschik |
| 2003/0055643 A1 | 3/2003 | Woestemeyer et al. |
| 2003/0099335 A1 | 5/2003 | Tanaka et al. |
| 2003/0220725 A1 | 11/2003 | Harter, Jr. et al. |
| 2004/0176906 A1 | 9/2004 | Matsubara et al. |
| 2004/0267534 A1 | 12/2004 | Beiermeister et al. |
| 2005/0125110 A1 | 6/2005 | Potter et al. |
| 2005/0215241 A1 | 9/2005 | Okada |
| 2006/0142917 A1 | 6/2006 | Goudy |
| 2007/0072616 A1 | 3/2007 | Irani |
| 2007/0255568 A1 | 11/2007 | Pennock |
| 2008/0070616 A1 | 3/2008 | Yun |
| 2009/0085728 A1 | 4/2009 | Catten et al. |
| 2009/0275281 A1 | 11/2009 | Rosen |
| 2010/0191535 A1 | 7/2010 | Berry et al. |
| 2010/0210254 A1 | 8/2010 | Kelly et al. |
| 2010/0233959 A1 | 9/2010 | Kelly et al. |
| 2010/0279626 A1 | 11/2010 | Bradley et al. |
| 2011/0003587 A1 | 1/2011 | Belz et al. |
| 2011/0009107 A1 | 1/2011 | Guba et al. |
| 2011/0021234 A1 | 1/2011 | Tibbitts et al. |
| 2011/0076996 A1 | 3/2011 | Burton et al. |
| 2011/0084852 A1* | 4/2011 | Szczerba ................. 340/905 |
| 2011/0115616 A1 | 5/2011 | Caspe-Detzer |
| 2011/0115618 A1 | 5/2011 | Catten et al. |
| 2011/0166748 A1 | 7/2011 | Schneider et al. |
| 2012/0041633 A1 | 2/2012 | Schunder et al. |

OTHER PUBLICATIONS

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

* cited by examiner

US 8,862,320 B2

METHOD AND APPARATUS FOR AMBIENT LIGHTING INCOMING MESSAGE ALERT

TECHNICAL FIELD

The illustrative embodiments generally relate to a method and apparatus for ambient lighting incoming message alert.

BACKGROUND

Hands-free call handling solutions are available in many vehicles on the road today. Often enabled through Bluetooth or other wireless technology, incoming and outgoing calls are processed through in-vehicle microphones and speakers.

U.S. Pat. No. 7,764,189 generally relates to an audio-coordinated visual indicator reducing vehicle operator distraction associated with using a communications device during vehicle operation. The visual indicator being placed within the operator's field of view and providing a synchronized visual display associated with the output from the communication device. Providing an apparent visual reference for the incoming sound freeing up the operator's mental resources, reducing distraction and allowing greater attention to be placed on operation. Comprising of a receiver; a visual indicator connected to an output of the receiver having an attribute that varies according to the received signal from the communication device.

U.S. Patent Application 2011/0003587, now U.S. Pat. No. 8,548,523 generally relates to methods, apparatus, and computer program products for changing alert setting of a communication device are provided. An operative connection of a communication device to a connected device is detected. Based on the operative connection to the connected device, it is determined whether an alert setting for the communication device should be changed. In response to determining that the alert setting should be changed, the alert setting for the communication device is automatically changed. The connected device is a network interface, a power adapter, and/or a headset.

U.S. Patent Application 2011/0084852, now U.S. Pat. No. 8,482,430 generally relates to an apparatus for communicating information to an operator of a vehicle without unnecessarily distracting the operator by illuminating an interior of the vehicle with different colors, includes an illumination control module monitoring an informational input and determining a lighting color command based upon the informational input. The apparatus further includes an illumination system communicating with the illumination control module and generating an illumination color upon the interior based upon the lighting color command.

SUMMARY

In a first illustrative example, a system includes a processor configured to receive settings for one or more vehicle ambient lighting activation sequences. The processor is further configured to receive a signal relating to a notification for which an audio sound could be played. The processor is additionally configured to recognize that an ambient light activation has been enabled. Also, the processor is configured to output a sequence of activated ambient lights within a vehicle, based on the settings and responsive to the received signal.

In a second illustrative example, a computer-implemented method includes receiving settings for one or more vehicle ambient lighting activation sequences. The method further includes receiving a signal relating to a notification for which an audio sound could be played. The method also includes recognizing that an ambient light activation has been enabled. Also, the method includes outputting a sequence of activated ambient lights within a vehicle, based on the settings and responsive to the received signal.

In a third illustrative example, a non-transitory computer-readable storage medium stores instructions that, when executed by a vehicle processor, cause the processor to perform a method including receiving settings for one or more vehicle ambient lighting activation sequences. The method further includes receiving a signal relating to a notification for which an audio sound could be played. The method also includes recognizing that an ambient light activation has been enabled. Also, the method includes outputting a sequence of activated ambient lights within a vehicle, based on the settings and responsive to the received signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
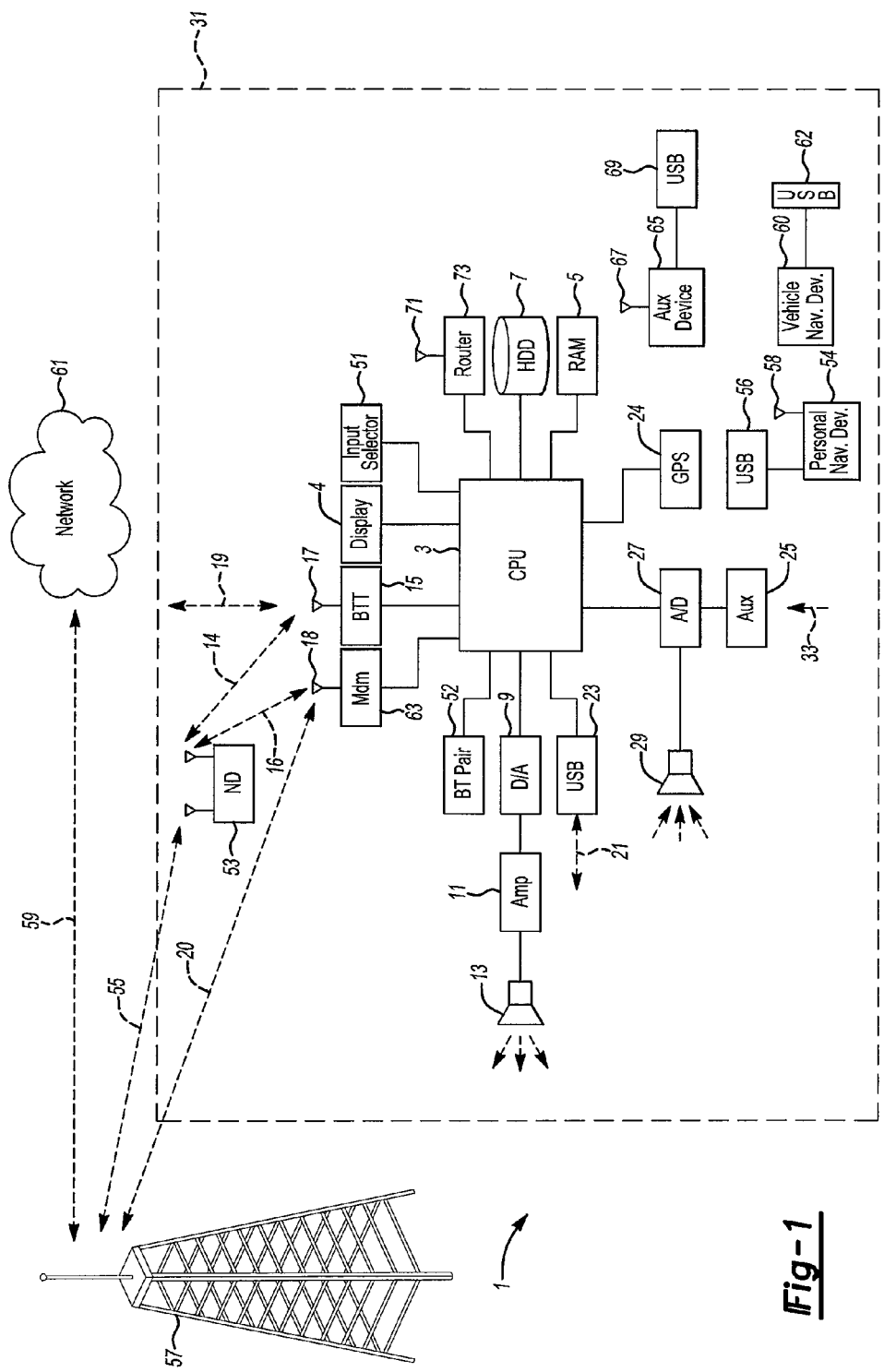
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Division Multiple Access (CDMA), Time Division Multiple Access (TDMA), Space-Division Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

While many vehicles come equipped with hands-free call handling, and while the call volumes are often controllable via the volume of the radio, incoming call notifications and other similar notifications are often played at a loud and startling volume.

By leveraging systems existing inside the vehicle, the proposed illustrative embodiments, and the like, allow for more reasonable and less startling notifications of incoming calls and other alerts.

Figure 2:
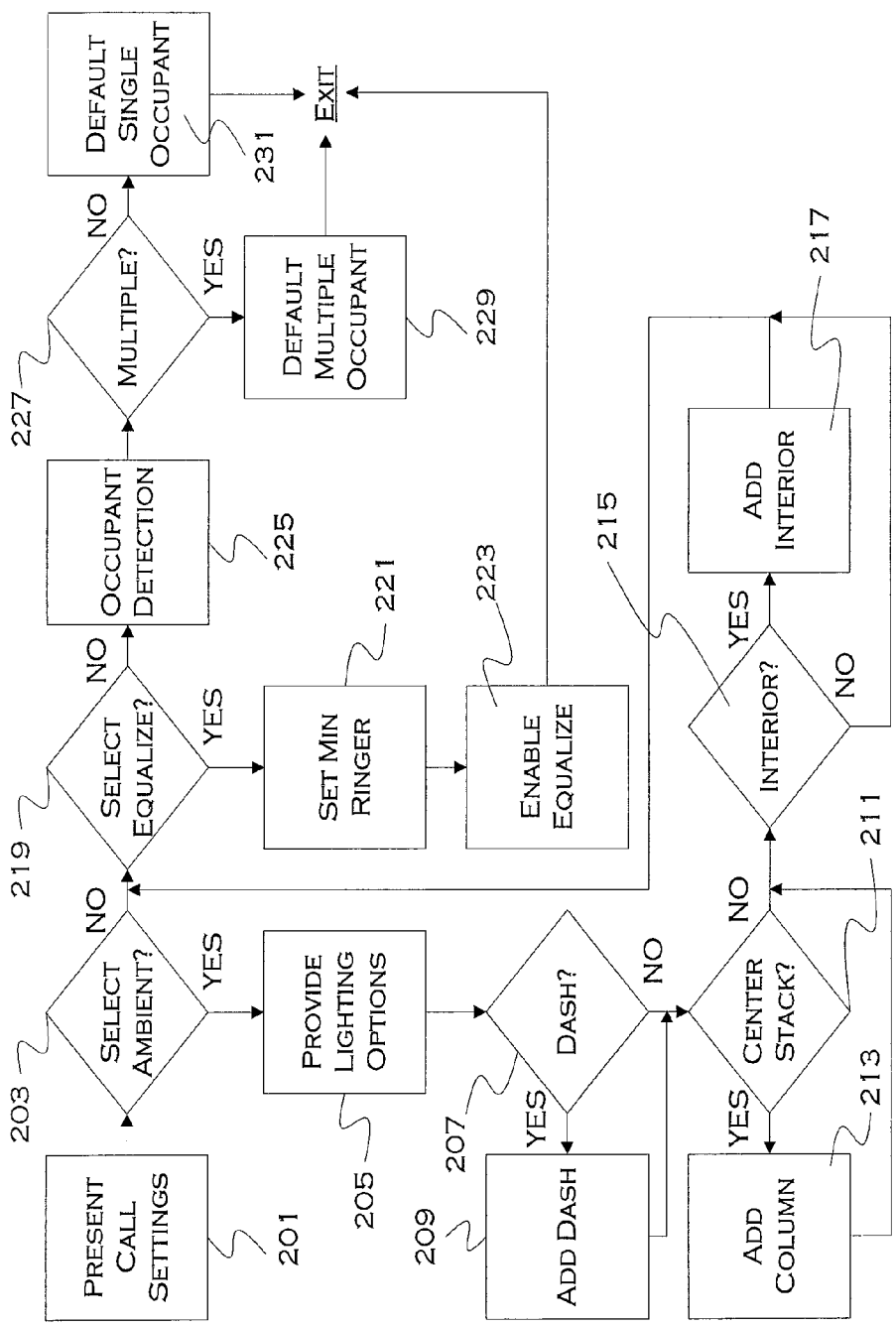
FIG. 2 shows an illustrative example of an incoming call notification configuration process.

FIG. 2 shows an illustrative example of an incoming call notification configuration process. Instead of simply playing a loud ringing noise, beep, or other notification when an incoming call is present, this process allows the user to configure other notifications using existing vehicle systems.

In this illustrative example, the process presents some number of call settings to a user for configuration 201. These can include, for example, selection of an ambient call setting, and other features related to the ambient call setting.

In this example, if the user selects to set an ambient lighting notification for call alerts 203, the process then provides a number of lighting options for selection 205. These can include, but are not limited to, dash board lighting, center column lighting, interior lighting, etc.

If the dash board lighting is selected 207, the process can add the dashboard (odometer, speedometer, etc. . . . ) light changes upon incoming call notification 209. While incoming calls are used for exemplary purposes, any sort of notification that would typically come in the form of an audio notification can be instead tasked with a visual light-based notification. The user may also be given a choice of various dashboard lights to enable for notification, so that a custom display can be selected.

If the center column lighting is selected 211, the process can add the column lighting for notification purposes 213. Again, as with the dashboard, various of the lights can be selected for enablement, disablement or flashing/brightening as is appropriate for the situation and based on driver selection. The third option, in this example, is to utilize interior lights of the vehicle 215. If these are selected, the process can add interior lighting to the selection. With regards to the interior lights, the occupant could select, front lights, back lights or some specific light, so that other occupants are not distracted/awakened.

For example, a driver could elect to have a speedometer flash and a driver's side interior light flash if an incoming call were present. Then, if on a trip at night with family sleeping in the car, the driver could minimize the chances that incoming calls would wake anyone in the vehicle with a loud notification sound.

Another option provided in this example is an equalization option 219. If the equalization option is selected, the process will enable control of an audible notification based on a current stereo level. Instead of utilizing a loud sound all the time, the process will play an alert based on a stereo level. In this example, there is also a minimum ringer level 221 that ensures that notifications come through even if a stereo is off or turned all the way down. Equalization is then enabled 223 so that volume controls can be used to control the incoming ringer sound.

Finally, in the configuration process, the system determines if multiple occupants are present 227. If there are multiple parties present in a vehicle, there is always a chance that a non-driving party is sleeping or otherwise does not want to be disturbed by incoming calls. In such a case, the process may have a default multiple-occupant setting 229 to which it defaults. This could include reduced-sound notification, use of ambient lighting instead of sound, etc. This and the single-occupant setting could also be user-configured.

If there is only one occupant present, the process defaults to a single occupant setting 231. Both default setting occur when specific changes have not been made to the audio system settings, in this illustrative example.

Figure 3:
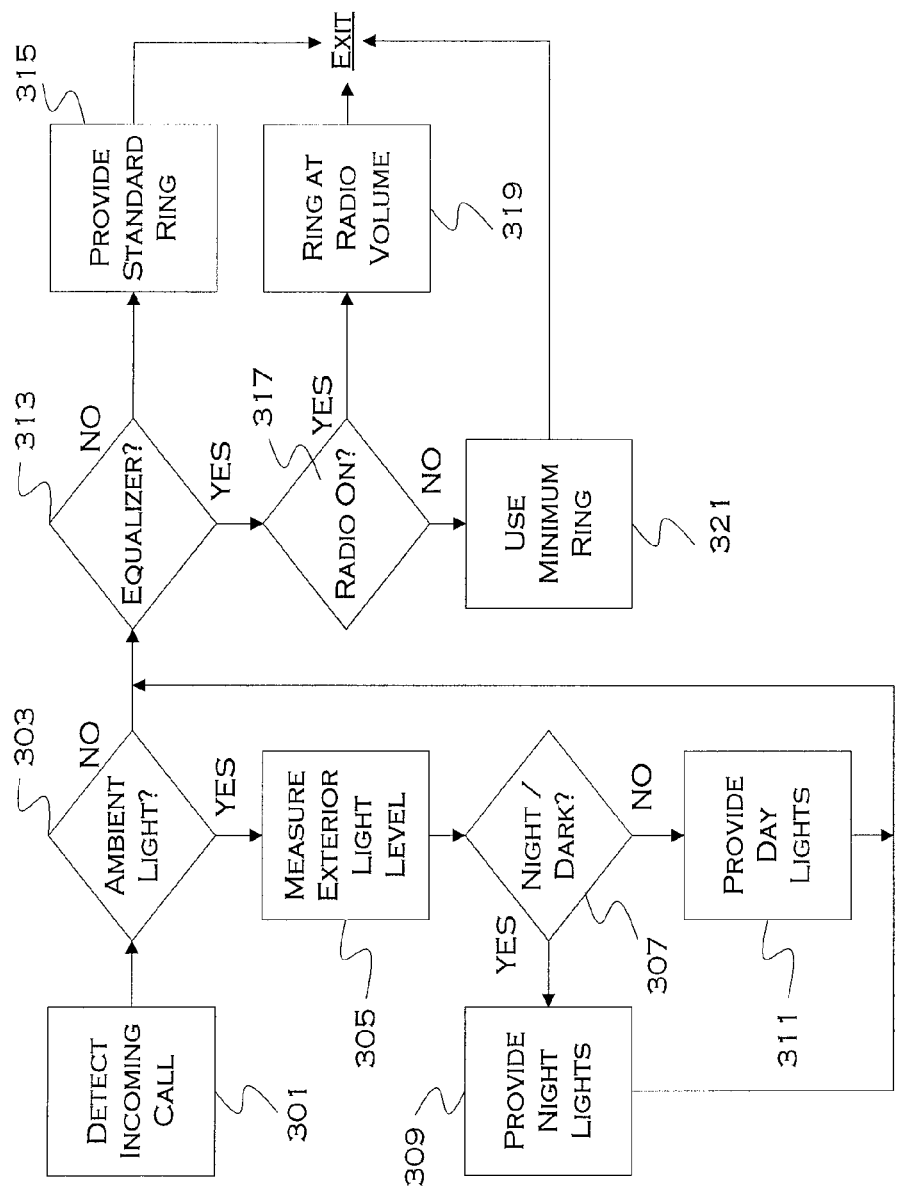
FIG. 3 shows an illustrative example of a notification process.

FIG. 3 shows an illustrative example of a notification process. In this illustrative example, the vehicle computing system detects an incoming call or other event for which driver notification is usually provided 301. This could include, for example, an end-of-call signal, a text signal, an email, a vehicle message or any other suitable event.

The process then determines if ambient lighting notification has been enabled 303. If such lighting has been enabled, the process, in this example, takes some measure of exterior light 305. This can be binary (e.g., light or dark outside) or it can be a gradient measurement of a truer light level. In this example, the measurement relates to a binary decision.

In an embodiment, the ambient light notification may detect the amount of light in the current environment and adjust the intensity of the notification. For example, if the ambient light notification is enabled, and it is night outside 307, the process provides ambient lighting that relates to a dark condition. In other words, the lighting will be appropriate for notification in the dark. The more light sources that are enabled, the less light each one may output as well, if desired, so that the vehicle isn't suddenly lit up like daylight by an incoming call in the middle of the night.

If it is not night or dark outside, the process provides lighting suitable for daytime notification 311. This could require, for example, brighter lights, to ensure that their presence is noticed. Also, in this example, the equalizer may be enabled 313. If the equalizer is not enabled, the process will provide a standard ring, beep or other notification 315.

If the equalizer is enabled and the radio is on 317, then the radio volume setting can be used to control the level of the notification. In such a case, the notification is presented at the level of the radio volume 319.

On the other hand, if the radio is off, then the volume control will not be set. In such a case, the equalization process can utilize the minimum ring volume 321 that was set when equalization was enabled.

Figure 4:
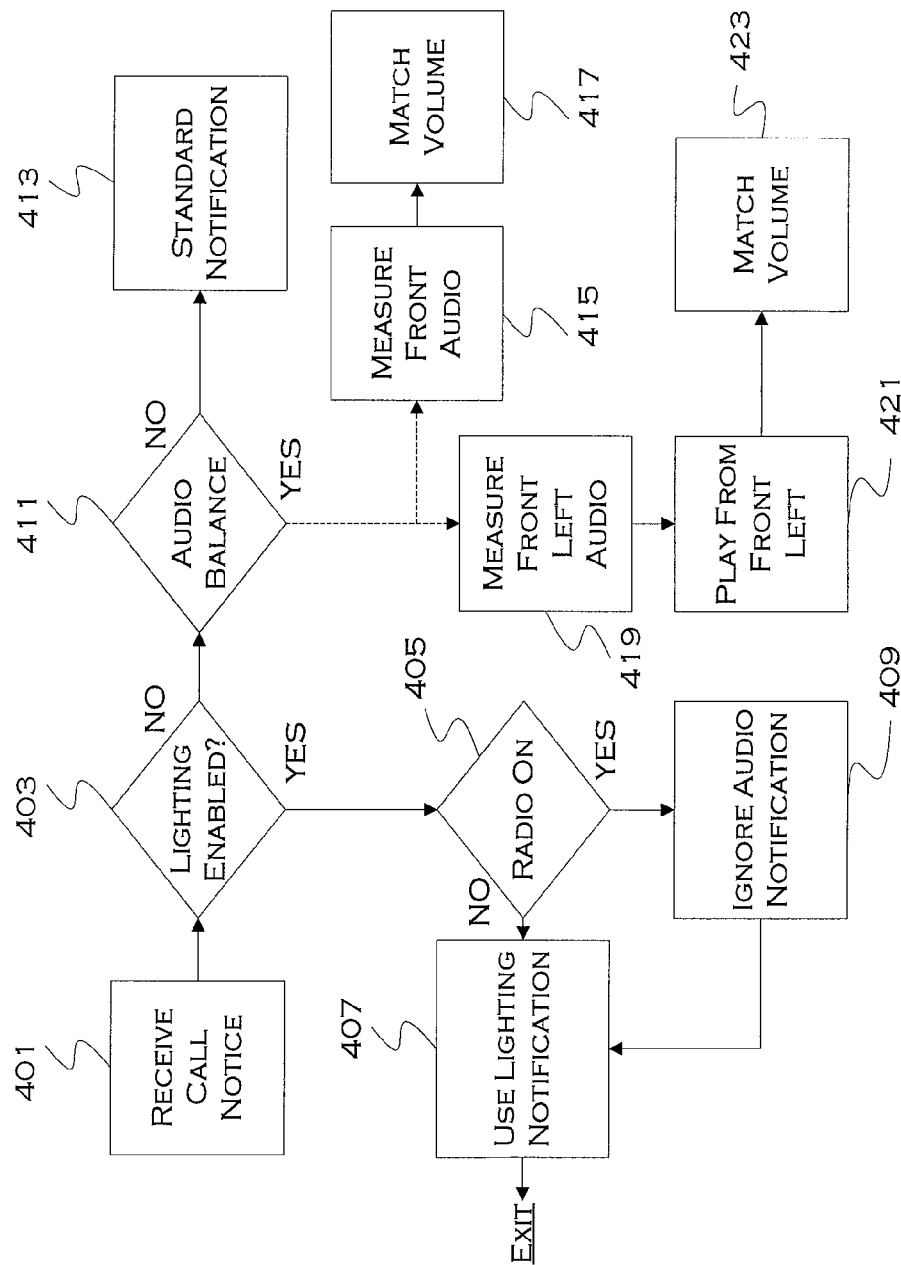
FIG. 4 shows an illustrative example of a second notification process.

FIG. 4 shows an illustrative example of a second notification process. In this illustrative example, the process receives notification that an incoming call or similar signal is present 401. In this illustrative example, the process checks first to see if the silent, ambient lighting notification is enabled 403. If the notification is enabled, and the radio is not currently turned on, the process will use a lighting notification 407. If the radio is on, this could create an opportunity for an audio notification as well, but since the lighting notification is being used, the process will set a flag to skip this or future audio notifications relating to this call 409. This can prevent, for example, a loud beep at the end of the call.

If the lighting conditions are not enabled, and if an audio equalization process is not set, the process will use a standard notification 413.

If the equalization process is set, in this example, the process not only provides audio matched to volume, but does it by zones. For example, in one case, a radio may be playing in the front of a vehicle but not in the back. If so, the process measures the front audio volume 415 and matches the volume for output 417.

Similarly, if the audio is only playing on the front right speaker, for example, the process will measure the volume at that speaker 419, and play the sound from the loudest or matched speaker 421, while matching the volume from that speaker 423. By isolating and controlling the sound in this manner, there is less likelihood of disturbing sleeping passengers and others in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   ambient vehicle lighting; and
   a processor configured to:
   receive settings for one or more vehicle ambient lighting activation sequences relating to notifications;
   receive a signal relating to a notification for which an audio sound playback is instructed;
   recognize that an ambient light activation has been enabled; and
   output a sequence of activated ambient lights of the ambient lighting based on the settings for the notification and responsive to the received signal, in lieu of playing the audio sound.

2. The system of claim 1, wherein the ambient lighting includes interior ceiling lights.

3. The system of claim 1, wherein the ambient lighting includes interior dashboard lights.

4. The system of claim 1, wherein the ambient lighting includes interior center stack lights.

5. The system of claim 1, wherein the processor is further configured to:
   recognize that an equalization activation has been enabled; and
   output the audio sound for the notification at a level coincident with a current stereo volume.

6. The system of claim 5, wherein, if the stereo level is set to minimum or zero, or if the stereo is off, the level is coincident with a minimum output level defined for notifications.

7. A computer-implemented method for activating ambient vehicle lighting comprising:
   receiving settings for one or more vehicle ambient lighting activation sequences relating to notifications;
   receiving a signal relating to a notification for which an audio sound playback is instructed;
   recognizing, via a vehicle computer, that an ambient light activation has been enabled; and
   outputting a sequence of activated ambient lights of the ambient lighting based on the settings for the notification and responsive to the received signal, in lieu of playing the sound.

8. The method of claim 7, wherein the ambient lighting includes interior ceiling lights.

9. The method of claim 7, wherein the ambient lighting includes interior dashboard lights.

10. The method of claim 7, wherein the ambient lighting includes interior center stack lights.

11. The method of claim 7, wherein the processor is further configured to:
    recognize that an equalization activation has been enabled; and
    output the audio sound for the notification at a level coincident with a current stereo volume.

12. The method of claim 11, wherein, if the stereo level is set to minimum or zero, or if the stereo is off, the level is coincident with a minimum output level defined for notifications.

13. A non-transitory computer-readable storage medium, storing instructions that, when executed by a vehicle processor, cause the processor to perform a method of activating vehicle ambient lighting comprising:
    receiving settings for one or more vehicle ambient lighting activation sequences relating to notifications;
    receiving a signal relating to a notification for which an audio sound playback is instructed;
    recognizing that an ambient light activation has been enabled; and
    outputting a sequence of activated ambient lights of the ambient lighting, based on the settings for the notification and responsive to the received signal, in lieu of playing the sound.

14. The storage medium of claim 13, wherein the ambient lighting includes interior ceiling lights.

15. The storage medium of claim 13, wherein the ambient lighting includes interior dashboard lights.

16. The storage medium of claim 13, wherein the ambient lighting includes interior center stack lights.

17. The storage medium of claim 13, wherein the processor is further configured to:
    recognize that an equalization activation has been enabled; and
    output the audio sound for the notification at a level coincident with a current stereo volume.

* * * * *